United States Patent [19]

Harris et al.

[11] 4,067,789

[45] Jan. 10, 1978

[54] PROCESS FOR MANGANESE REMOVAL FROM ZINC METAL BEARING SOLUTIONS

[75] Inventors: Leonard Harris, Cos Cob; Alfred K. Hanson, Jr., Danbury, both of Conn.

[73] Assignee: Newmont Exploration Limited, Danbury, Conn.

[21] Appl. No.: 682,442

[22] Filed: May 3, 1976

Related U.S. Application Data

[63] Continuation-in-part of Ser. No. 594,278, July 9, 1975, abandoned.

[51] Int. Cl.$^2$ .................. C25C 1/16; C01G 45/02; C01G 49/14
[52] U.S. Cl. .................. 204/119; 423/50; 423/146
[58] Field of Search .............. 204/119; 423/50, 146

[56] References Cited

U.S. PATENT DOCUMENTS

| 1,395,811 | 11/1921 | Gepp ................................ 204/119 |
| 3,438,878 | 4/1969 | Bell et al. ........................... 204/119 |
| 3,667,906 | 6/1972 | Sasaki ................................. 423/49 |
| 3,691,038 | 9/1972 | Roepenack et al. ............. 204/119 |

Primary Examiner—R. L. Andrews
Attorney, Agent, or Firm—Pennie & Edmonds

[57] ABSTRACT

A process for the preferential removal of soluble manganous ions from a metal bearing solution, particularly a zinc sulfate solution to be subjected to electrolysis for the recovery of zinc, comprising treating said solution with an oxidant capable of oxidizing soluble manganous ion to insoluble and filterable gamma-manganese dioxide at a temperature and for a time sufficient to precipitate at least a portion of the manganese present in said solution as gamma-manganese dioxide, said oxidant being in an amount of from about 130% to 150% of the theoretical amount required for substantially total manganese removal from said solution, and separating said precipitate from said solution.

9 Claims, 1 Drawing Figure

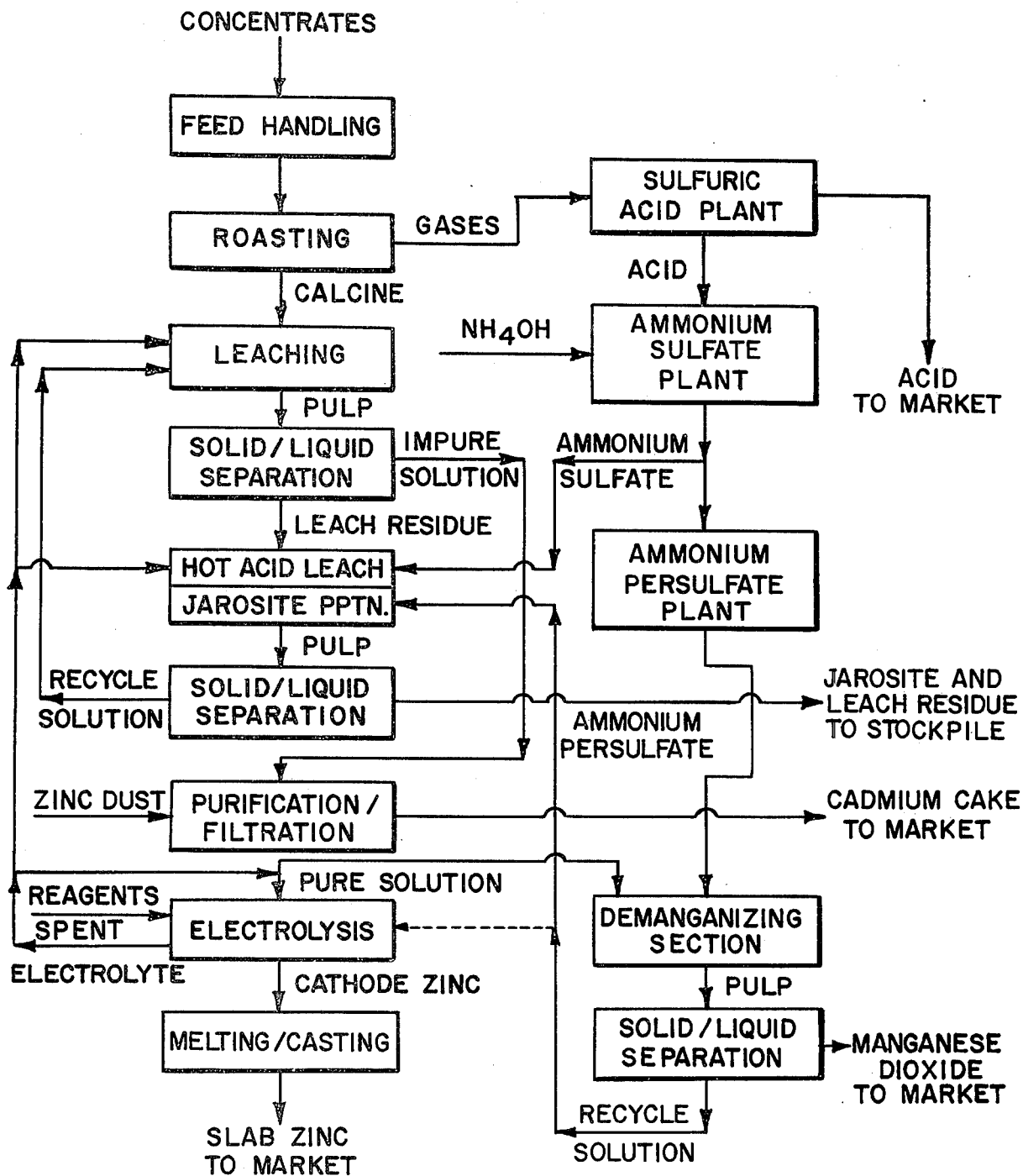

PROCESS FOR MANGANESE REMOVAL FROM ZINC METAL BEARING SOLUTIONS

CROSS REFERENCE TO RELATED APPLICATION

This application is a continuation-in-part of application Ser. No. 594,278, filed July 9, 1975, now abandoned.

BACKGROUND OF THE INVENTION

Excessive manganese, in solutions containing metals, such as leach extracts, to be treated by electrolysis procedures for the recovery of the metals has caused problems of decreased current efficiencies during electrolytic recovery of the desired metal on the cathodes and manganese deposition on the anodes as well as poor physical and chemical characteristics of the metals recovered.

This problem of manganese and its build-up in the solutions and contamination of the desired metal has been overcome to some extent in electrolytic plants by employing a more "reactive" anode or by bleeding-off part of the solution for neutralization and separation of the desired metal by chemical precipitation prior to further treatment. Thus, for example, in electrolytic recovery of zinc, chemical lead anodes have been used in place of the normal lead/silver alloy anodes. Other efforts at overcoming the problems include the method of cleaning the manganese deposit from the anodes and cells more frequently which is expensive and time-consuming particularly where high levels of manganese are dissolved in the liquor. Moreover, in some of the procedures dealing with the removal of manganese, there is the undesired removal or loss of significant amounts of the metal desired to be recovered during the manganese removal step.

With particular reference to zinc recovery by electrolysis, this problem of manganese contamination of the electrodes is aggravated when the "Jarosite Process" is used in the recovery of zinc. The "Jarosite Process" is a well-known iron removal process employed subsequent to high acid leaching which can increase the recovery of zinc from roasted sulfide concentrates by the electrolytic zinc process. What transpires is that the roasted zinc concentrate is subjected to a strong sulfuric acid leach followed by treatment using, preferably, an ammonium ion to precipitate the iron to give a zinc sulfate solution free of the iron and with very little loss of the zinc. With such highly acid leaching, there is even a further solubilization of the manganese present in the roasted zinc sulfate concentrate which causes increased problems of electrode fouling and contamination of the desired zinc during electrolytic recovery of the zinc.

BRIEF SUMMARY OF THE INVENTION

The present invention provides a process for the removal of soluble manganous ions as insoluble gamma-manganese dioxide from zinc sulfate-bearing solutions without any excessive loss of the zinc which it is desired to recover, particularly with respect to removal of manganese from leach solutions in which said metal is to be recovered by electroytic procedures. The present invention further provides for the production of readily filterable gamma-manganese dioxide-containing pulp.

Briefly stated, the present invention comprises the steps of treating said zinc sulfate-bearing solution with an oxidant capable of oxidizing soluble manganous ion to insoluble gamma-manganese dioxide at a temperature and for a time sufficient to precipitate at least a portion and preferably at least about 90% of the manganous ion present in said solution as filterable gamma-manganese dioxide, said oxidant being in an amount of from about 130% to 150% of the theoretical amount required for substantially total manganese removal from said solution, and separating said precipitate from said solution. In its preferred embodiment, the instant invention comprises the improvement in the "Jarosite Process" for the recovery of zinc wherein prior to electrolytic recovery of the zinc the leach liquor is treated with a persulfate oxidant such as ammonium persulfate so as to oxidize the soluble manganese ion to insoluble gamma-manganese dioxide and after removal of the manganese dioxide to utilize the remaining ammonium ion and sulfate radical in the preparation of the Jarosite precipitate, which results in the removal of iron from the leach liquors.

BRIEF DESCRIPTION OF THE DRAWING

The single figure of drawing is a flow diagram of the electrolytic zinc process embodying the "Jarosite Process" and including the improvement of the instant invention relating to the removal of the manganous ion prior to recovery of the zinc by electrolysis.

DETAILED DESCRIPTION

In the description that follows and in the Examples there will be discussion of the suitability of the instant invention for the preferential removal of soluble manganous ion as insoluble gamma-manganese dioxide from zinc solutions, particularly zinc sulfate solutions, which is the preferred embodiment of the invention. It will be understood, however, that the description given herein with respect to conditions which are optimum and/or preferred for preferential removal of manganous ions from zinc sulfate solutions are applicable to the removal of such ions from the solutions containing other metals including copper, nickel, cobalt, cadmium and mixtures thereof.

While other manganese containing solutions may be successfully treated in accordance with the process of the instant invention, it is particularly beneficial in the treatment of metal sulfate solutions in general and zinc sulfate leach liquors in particular. Moreover, while it is preferred to treat such leach liquors that are to be subjected to electrolysis for the recovery of zinc, the invention can be used for the treatment of any liquors in which it is desired to preferentially remove the manganese.

As to the oxidant used in the present invention, it is necessary to use an agent capable of oxidizing soluble manganous ion, $Mn^{+2}$, to insoluble manganese dioxide. There are a number of oxidants which can accomplish this result and the choice is dependent mainly on economic factors and the undesirability, in some cases, of introducing deleterious elements into the solution. In the case of an electrolytic zinc plant circuit, for example, it would not be appropriate to use lead or bismuth containing oxidants which could contaminate the refined zinc. It would be appropriate, however, and advantageous to use in such circuits ammonium or sodium persulfate as oxidants since the ammonium or sodium ions and sulfate radical can subsequently be used in the Jarosite formation step for iron removal from the leach liquors. By way of illustration, suitable oxidants are ammonium persulfate, sodium persulfate, potassium persulfate, sodium bromate, sodium bismuthate, and lead dioxide. Of these the preferred oxidants are the ammonium and sodium persulfates by virtue of their ready availability, ease of handling and production, the fact that they do not contaminate the metal desired to be recovered, and, more particularly, because, as noted above, these persulfates have the advantage of a further use for iron removal from the liquors in the "Jarosite Process" step of the electrolytic process for the recovery of zinc.

It is essential for the successful removal of insoluble manganous ions from zinc-bearing solutions that there be substantially no co-precipitation of the zinc metal with the manganese dioxide since such co-precipation results in an unacceptable and uneconomical loss of the valuable zinc metal. In this regard, while the precise theory is not entirely understood, it has been discovered that when zinc co-precipitates with manganese there results a precipitate comprised principally of hydrated manganous manganite, $ZnO.6MnO_2.2-4H_2O$, containing chemically bonded zinc. Moreover, it has been observed that such hydrated manganous manganite is formed to a large extent when the oxidant is employed in an amount substantially above about 150% of the theoretical amount required for substantially total manganese removal and that under these conditions the hydrated manganous manganite contains significant zinc, approximately 8–9%, in apparent chemical substitution for the manganese. Under such conditions the amount of zinc that is co-precipitated with the manganese is unaffected by intensive washing of the precipitate.

It has similarly been discovered that when the oxidant is employed in an amount below about 150% of the theoretical amount required for substantially total manganese removal, the resulting crystalline phase precipitate will contain substantially less hydrated manganous manganite and in fact gamma-manganese dioxide, $\gamma MnO_2$, becomes the dominant phase, which, incidentally, is economically desirable for use in the battery industry. Such gamma-manganese dioxide retains a minimum amount, or substantially no zinc. Thus it can be seen that it is essential for successful operation of the claimed invention that the precipitate be substantially in the crystalline form of gamma manganesxe dioxide to the substantial exclusion of the zinc-bonded manganous manganite.

The identification of the crystalline phases of hydrated manganous manganites and gamma-manganese dioxide as a function of the amount of oxidant employed is confirmed by X-ray diffraction patterns of the precipitates (oven-dried below 100° F.) which show significant variations in crystallinity and phase composition relative to conditions of oxidant during precipitation. At higher oxidation, i.e., when the oxidant is above about 150%, manganous manganites are formed that display XRD patterns similar to $\delta MnO_2$, and that are represented in nature by the mineral, birnessite, corresponding to the formula $(Na_{0.7}Ca_{0.3})Mn_7O_{14}.2.8H_2O$. A number of metallic ions, including zinc, are reported to be bonded to similar varieties of this mineral phase. (Feitknecht, W. P. and Marti, W., (1945a), "Über die Oxydation von Mangan Hydroxyd mit Molekularen Sauerstoff," Helv. Chim. Acta, Vol. 28, pp 129–148; Feitknecht, W. P. and Marti W., (1945b), "Über Manganit und Kunstlichen Braunstein," Helv. Chim. Acta, Vol. 28, pp 148–156; Buser, W., Graff, P., and Feitknecht, W., (19540, "Beitrag zur Kenntnis der Mangan (II)-Manganit und des $\delta MnO_2$," Helv. Chim Acta, Vol. 37, pp 2322-2333; Jones, L. H. P. and Milne, A. A., (1956), "Birnessite, a New Manganese Oxide Mineral from Aberdeenshire, Scotland," Mineral. Mag. Vol. 31, pp 283–288).

In less oxidized precipitates, i.e., when the oxidant is below about 150%, additional lines appear in XRD patterns at 2.12, 1.63 and 4.04A, indicating either a new crystalline phase, or a modification of the manganous manganite phase. XRD data suggest a progressive phase transition to a less hydrated form of $MnO_2$ (incipient $\nu MnO_2$). This was subsequently confirmed by the precipitation of major amounts of $\nu MnO_2$ at lower oxidation conditions. Under such conditions of lower oxidation, dark brownish-black precipitates are formed containing minor amounts of zinc (1–21 % Zn) and whose X-ray diffraction patterns bear no resemblance to birnessite and other manganite phases, but correlate closely with those of $MnO_2$.

When using lower amounts of oxidant, the manganese precipitate, determined by X-ray diffraction analysis to be crystalline manganese dioxide of the gamma type, is believed to be formed according to the following chemical reaction:

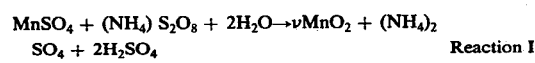

$$MnSO_4 + (NH_4)_2S_2O_8 + 2H_2O \rightarrow \nu MnO_2 + (NH_4)_2SO_4 + 2H_2SO_4 \qquad \text{Reaction I}$$

When higher quantities of oxidants are used, the zinc-manganese complex formed and identified by X-ray diffraction analysis as manganous manganite containing zinc is believed to result from the following reaction:

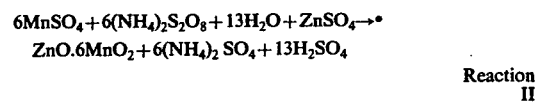

$$6MnSO_4 + 6(NH_4)_2S_2O_8 + 13H_2O + ZnSO_4 \rightarrow ZnO.6MnO_2 + 6(NH_4)_2SO_4 + 13H_2SO_4 \qquad \text{Reaction II}$$

Not only is the production of a substantially zinc-free gamma-manganese dioxide necessary for successful operation of a commercially viable manganese removal process, but it is also necessary that the resulting precipitate be readily filterable so as to allow the easy separation of the precipitate from the solution. In this regard, it has been discovered that, notwithstanding the requirement that the oxidant should be employed in an amount of from below about 150% to minimize co-precipitation of zinc and to ensure that the gamma-manganese dioxide crystalline form be predominant, when the amount of oxidant employed is substantially below about 130% of the theoretical amount required for substantially total manganese removal there results a gamma-manganese dioxide precipitate, brown to black in color, which is in the colloidal state. Such a colloidal precipitate is of course not readily filterable and therefore tends to be commercially unsatisfactory.

Not only does a poorly filterable colloidal gamma-manganese dioxide precipitate form under the above-mentioned conditions of low amounts of oxidant, but it has also been observed that the precipitate formed under these conditions contains varying amounts of zinc sulfate which, as the relative amount of oxidant is decreased, becomes increasingly difficult to wash out. As is the case of co-precipitation of zinc metal at high oxidant usage, such zinc sulfate loss is also unsatisfactory from an economical and commercial standpoint.

Thus, it can be seen that when the amount of oxidant is substantially above about 150% of the theoretical amount required for substantially total manganese removal, the precipitate, though possessing good filterability, nevertheless is of the manganous manganite crystalline form whereby a substantial amount of zinc metal is co-precipitated. When the oxidant is substantially below about 130%, a precipitate is formed which, though being substantially of the gamma-manganese dioxide crystalline form and substantially free of co-precipitated zinc metal, is nevertheless not readily filterable. Accordingly, it is a feature of the present invention that the oxidant be in an amount of from about 130% to 150% of the theoretical amount required for substantially total manganese removal as gamma-manganese dioxide, and it is preferable that the oxidant be in an amount of between about 130% to 140%.

The temperature of the oxidation reaction can be carried out at temperatures ranging from about 90° C. to boiling. In actual plant practice, it would be advisable to keep the temperature below boiling.

The reaction times can be as little as about 30 minutes and preferably about two hours.

The oxidation is preferably carried out at atmospheric pressure, thus eliminating the need for pressure equipment, such as autoclaves, although, if desired, pressures at higher than atmospheric can be used.

Lastly, there is the question of hydrogen ion concentration of the solution. A wide range of pH is suitable, but it is preferred that the pH be kept within the range of about 5 to 12. It has been found that solutions which are highly acidic tend to break down oxidants of the persulfate type and that, consequently, more oxidant must be used to overcome this loss in order to obtain maximum manganese precipitation.

Within the parameters discussed above, it will be evident that factors such as amount of oxidant, the reaction time, reaction temperature, and pH of the solution can be varied to give the optimum recovery desired for a particular metal bearing solution. The conditions noted above as being preferred are those most suitable for zinc sulfate solutions, particularly when the zinc is to be recovered by electrolysis and employing the "Jarosite Process" and it will be evident that, keeping the instant invention in mind, it requires but routine experimentation by those skilled in this art to find the most optimum conditions within the ranges noted for the removal of manganese from solutions containing other metals such as copper, nickel, cadmium, and the like.

Reference has been made above to the "Jarosite Process". This term is used herein to refer to a well-known improvement in the method of recovering zinc electrolytically from roasted sulfide concentrates relying on high acid leaching followed by the precipitation of iron using sodium, potassium, or ammonium ions prior to electrolytic recovery of the zinc. A more detailed description appears in the United States Edition of "World Mining" of September 1972, pp. 26 to 30.

Referring to the single sheet of drawing, there is shown a conventional electrolytic system for the recovery of zinc utilizing jarosite precipitation as well as demanganizing in accordance with the instant invention. The removal of the manganese minimizes electrolyte fouling, greatly increases the operating time of the electrolytic cell, and keeps the cathode zinc at the greatest purity. The process described in the flow sheet is self-explanatory with respect to the overall process, but, for more completeness, will be further described.

Zinc sulfide concentrates are conveyed to roaster feed bins and then to roasters, most suitably of the fluid-bed type, where the concentrate is heated at a temperature of about 950° C. to convert the zinc sulfide in the concentrate to zinc oxide (calcine) and sulfur dioxide gas.

The zinc calcine is cooled, ground to 90%-200 mesh and conveyed to leach tanks where the zinc oxide and whatever zinc sulfate may be present are dissolved by the use of sulfuric acid. To effect the maximum recovery of zinc, leaching can be carried out in two or more steps: a neutral leaching at a pH of about 4.5 to 5 followed by separation of the liquid containing the zinc from the solids, and one or more stages of hot acid leach to which ammonium sulfate is added to one of the stages.

It is at the final phase of these leaching steps that iron is precipitated as the complex compound ammonium jarosite, $2NH_4[Fe_3(SO_4)_2(OH)_6]$ which is then separated together with the other undissolved materials. The liquid recovered containing the dissolved zinc sulfate is returned to the initial leaching step.

The solution containing the dissolved zinc from the first "neutral" leaching step is purified (the copper and/or cadmium present are removed by precipitation with zinc dust) and filtered and a portion of the resulting "pure" solution subjected to demanganizing with ammonium persulfate in accordance with the present invention, as described above and as further illustrated in the Examples that follow. After separation of the manganese dioxide, the demanganized solution is returned to the hot acid leach circuit where the contained ammonium ion and sulfate radical can be utilized for jarosite formation or for electrolysis.

The remaining pure solution is conveyed to electrolytic cells where, by the application of direct electric current thereto, the acidified zinc sulfate solution is decomposed and the metallic zinc deposited on the cathode (conventionally aluminum).

The cathode zinc is removed from the cathode, melted in a furnace, such as an electric low-frequency induction furnace and cast into slabs, blocks, or the other forms utilized commercially.

The invention will be further described in connection with the following Examples which are set forth for the purpose of illustration only and in which proportions are by weight unless expressly stated to the contrary.

EXAMPLE I

To 50 milliliters of an acid zinc sulfate solution containing 40.5g/l Zn and 4.28g/l Mn (and whose full analysis is set forth in Table I below) obtained from the leaching of roasted zinc sulfate flotation concentrate with dilute sulfuric acid, was added approximately 5 grams of ammonium persulfate and the pH adjusted to slightly acidic with ammonium hydroxide.

The solution was boiled for approximately 30 minutes and the resultant precipitate filtered off and washed with distilled water. The filtrate was analyzed for zinc by volumetric titration and for manganese by atomic absorption.

The demanganized solution analyzed 35.2g/l Zn and 0.0026g/l Mn indicating a selective removal of 99.94% of the manganese with only 13.1% of the zinc.

Table I

SOLUTIONS TESTED FOR MANGANESE REMOVAL

| Solution Type | g/l Zn | g/l Mn | mg/l Fe | mg/l Cu | mg/l Cd | mg/l Co | mg/l Ni | mg/l Pb | mg/l As | mg/l Sb | mg/l Ag | mg/l Se | mg/l Te | g/l $H_2SO_4$ | pH |
|---|---|---|---|---|---|---|---|---|---|---|---|---|---|---|---|
| Neutral Zinc Sulfate[1] | 116.3 | 5.24 | 0.4 | 1.71 | 148 | 1.5 | 0.7 | 4.3 | <5 | <2 | .070 | <1 | 5.0 | — | 5.3 |
| Solution of Example 1[2] | 40.5 | 4.28 | 41.0* | 292 | 152 | 4.0 | 1.6 | — | — | — | — | — | — | 103.6 | — |
| Purified Zinc Sulfate[3] | 112.2 | 5.34 | <1 | <.5 | <.5 | 1.5 | <1 | <1 | <5 | <2 | <.4 | <1 | <5 | — | 5.3 |
| Manganous Sulfate[4] | — | 4.76 | — | — | — | — | — | — | — | — | — | — | — | — | — |
| Cupric Sulfate[4] | — | 5.05 | — | 4.75* | — | — | — | — | — | — | — | — | — | — | — |
| Cadmium Sulfate[4] | — | 5.00 | — | — | 50.0* | — | — | — | — | — | — | — | — | — | — |
| Cobaltous Nitrate[4] | — | 5.05 | — | — | — | 52.5* | — | — | — | — | — | — | — | — | — |
| Nickel Sulfate[4] | — | 6.25 | — | — | — | — | 41.4* | — | — | — | — | — | — | — | — |

*g/l
[1] Prepared by leaching roasted zinc sulfide concentrate with dilute sulfuric acid and increasing the manganese content of the solution from 0.77 g/l to 5.24 g/l by adding manganous sulfate.
[2] Prepared by leaching the residue from (1) with dilute sulfuric acid. No additional manganous sulfate was added.
[3] Prepared by adding metallic zinc powder to solution similar to (1) for precipitation and removal of varius elements.
[4] Prepared by dissolving chemically pure salts in deionized water.

EXAMPLE 2

Ammonium persulfate was added to samples of the various solutions shown in Table I and agitated at 90° C. to boiling for periods ranging from 15 minutes to 2 hours. The amount of ammonium persulfate added was varied according to the necessities of manganese content, hydrogen ion concentration, reaction temperature and time, and the other conditions discussed above.

The resultant precipitate was removed in each case by filtration and the filter cake washed with water. The filtrate was analyzed for the various elements shown in Table II, and the removal of manganese and other metals calculated.

As can be seen from the Table II, the solutions which respond to the process covered a wide variety containing major amounts of manganese and metals such as zinc, copper, nickel, cobalt, cadmium and iron. Solutions containing only one of the metals, or several of the metals, were found to be equally susceptible to the process.

Manganese was removed selectively from these solutions with only minor amounts of the other metals reporting in the manganese precipitate.

with various oxidants added to the solutions in the amount of 100g/l. The solutions were filtered and the filter cake washed with water and the filtrate analyzed for manganese.

The results are shown in Table III and clearly indicate the near-complete removal of manganese in all cases.

The oxidants used were ammonium peroxydisulfate $(NH_4)_2S_2O_8$, sodium peroxydisulfate $(Na)_2S_2O_8$, potassium peroxydisulfate $K_2S_2O_8$ (also known as persulfates), sodium bismuthate $NaBiO_3$, sodium bromate $NaBrO_3$ and lead dioxide $PbO_2$.

TABLE III

MANGANESE REMOVAL FROM NEUTRAL ZINC SULFATE SOLUTION (5.24 g/l Mn) EMPLOYING DIFFERENT OXIDANTS

| Oxidant Used | Demanganized Solution g/l Mn | % Manganese Precipitated |
|---|---|---|
| Ammonium Persulfate $(NH_4)_2S_2O_8$ | 0.0086 | 99.84 |
| Sodium Persulfate $(Na)_2S_2O_8$ | 0.0024 | 99.95 |
| Potassium Persulfate $K_2S_2O_8$ | 0.0095 | 99.82 |
| Sodium Bismuthate $NaBiO_3$ | 0.016 | 99.69 |
| Sodium Bromate $NaBrO_3$ | 0.0027 | 99.96 |
| Lead Dioxide | | |

TABLE II

DEMANGANIZED SOLUTIONS AFTER TREATMENT WITH AMMONIUM PRESULFATE (SEE TABLE I FOR ORIGINAL ANALYSIS)

| Solution Type | $(NH_4)_2S_2O_8$ Added g/l | Analysis g/l Mn | g/l Zn | g/l Fe | g/l Cu | g/l Cd | g/l Co | g/l Ni | % Removed Mn | Zn | Fe | Cu | Cd | Co | Ni |
|---|---|---|---|---|---|---|---|---|---|---|---|---|---|---|---|
| Neutral Zinc Sulfate | 28 | .002 | — | — | — | — | — | — | 99.99 | 0.13[1] | — | — | — | — | — |
| Acid Zinc Sulfate | 75 | 1.66 | 38.83 | 39.0 | — | — | — | — | 61.21 | 4.12 | 4.88 | — | — | — | — |
| Purified Zinc Sulfate | 30 | .0006 | — | — | — | — | — | — | 99.97 | 0.16[1] | — | — | — | — | — |
| Manganous Sulfate | 100 | .004 | — | — | — | — | — | — | 99.92 | — | — | — | — | — | — |
| Cupric Sulfate | 30 | <.001 | — | — | 45.8 | — | — | — | 99.99 | — | — | 3.58 | — | — | — |
| Cadmium Sulfate | 30 | <.001 | — | — | — | 47.5 | — | — | 99.99 | — | — | — | 5.00 | — | — |
| Cobaltous Nitrate | 30 | .0025 | — | — | — | — | 50.0 | — | 99.95 | — | — | — | — | 4.76 | — |
| Nickel Sulfate | 30 | .005 | — | — | — | — | — | 36.1 | 99.92 | — | — | — | — | — | 12.8 |

[1] Calculated from zinc content of precipitate.

EXAMPLE 3

Samples of neutral zinc sulfate solution containing 116.3g/l Zn and 5.24g/l Mn (see Table I for full analysis) were heated to boiling for approximately 15 minutes

TABLE III-continued
MANGANESE REMOVAL FROM NEUTRAL ZINC SULFATE SOLUTION (5.24 g/l Mn) EMPLOYING DIFFERENT OXIDANTS

| Oxidant Used | Demanganized Solution g/l Mn | % Manganese Precipitated |
|---|---|---|
| $PbO_2$ | 0.0005 | 99.99 |

EXAMPLE 4

A series of tests in which samples of neutral zinc sulfate solution were agitated at 90° C. for varying periods of time with different amounts of ammonium persulfate are shown in Table IV. As before, the resultant solutions were filtered and the precipitates washed with water. In these tests, however, both the filtrates and precipitates were analyzed for zinc and manganese. The zinc and manganese removal could, therefore, be calculated on the basis of the analysis of both materials.

As can be seen from the results presented in Table IV, manganese was precipitated from solutions when using a broad range in the amount of oxidant added, i.e., from 50% to 460% of the theoretical amount needed to precipitate the manganese, as manganese dioxide. The following information is pertinent to each of the tests which are summarized in Table IV:

Test 10A

Zinc sulfate solution containing 5.24 g/l Mn was agitated at 90° C. for 30 minutes with sufficient ammonium persulfate to precipitate 460% of the contained manganese. The pulp filtered readily, but the precipitate was found to be principally manganous manganite $ZnO.6MnO_2.2-4H_2O$ analyzing high in zinc at 8.00% Zn. X-ray defraction analysis shows that no gamma manganese dioxide was present and only a minor amount of zinc sulfate was found in the precipitate, proving that most of the zinc was chemically bonded in the manganous manganite.

Test 11

This test was carried out as for Test 10A, but the amount of ammonium persulfate used was lowered to 230% of the theoretical. The pulp filtered readily, but the precipitate was still high in zinc at 9.40% Zn and consisted principally of manganous manganite with a small amount of gamma manganese dioxide beginning to show. Zinc sulfate was also present, indicating that some of the zinc contained in the precipitate was due to inefficient washing of the filter cake.

Test 12

This test duplicated Test 11, except that the agitation was extended to 60 minutes and careful washing of the filter cake was practiced. The results were as for Test 11, but the precipitate was lower in zinc at 5.60% Zn, because of the improved filter cake washing technique. Again, the precipitate was principally manganous manganite with some gamma manganese dioxide present.

Test 13

The conditions for this test paralled those used for Test 12, except that the ammonium persulfate used was reduced further to 130% of the theoretical requirements for manganese precipitation. The pulp filtered readily and the precipitate consisted entirely of gamma manganese dioxide. No manganous manganite was detected, and the precipitate contained only 1.82% Zn. Manganese removal from solution amounted to 92.65%.

Test 14

Test 13 was repeated but the reaction time was increased from 60 minutes to 120 minutes. Again, the pulp filtered very readily and the precipitate consisted of gamma manganese dioxide low in zinc at 1.78% Zn and manganese removal from solution increased to 99.99%.

Test D-8

In this test zinc sulfate solution containing 3.90 g/l Mn was used and sufficient ammonium persulfate added to precipitate 133% of the contained manganese. Agitation was effected at 90° C. for 2 hours, and the pulp filtered very readily. The precipitate consisted principally of gamma manganese dioxide, but some zinc sulfate was present because of inefficient washing. No manganous manganite was detected.

Tests D-3, D-4, D-2, D-1

These tests were conducted with the same solution used for Test D-8 and sufficient ammonium persulfate to theoretically precipitate 102%, 102%, 82% and 50% of the manganese present in solution, respectively. Filtration became increasingly difficult as the amount of oxidant was decreased; and at 50% of the theoretical needs, the precipitate was so fine that it passed completely through the filter paper.

Agitating the solution for a longer period of 3 hours in Test D-4 (102% ammonium persulfate) vs. 2 hours in Test D-3, did not improve the situation with respect to filterability. As can be seen, the precipitates consisted mainly of gamma manganese dioxide with varying amounts of zinc sulfate which became increasingly difficult to wash out as the amount of oxidant was reduced. The manganese dioxide precipitates produced in these tests were very fine; whereas these fine particles had bonded together in the tests using ~130% of the theoretical amount of ammonium persulfate, to form agglomerates, which resulted in rapid and efficient filtration and allowed for efficient washing to remove zinc sulfate.

According to XRD data, precipitates from Test 10A match the reported patterns for birnessite. In less oxidized precipitates, i.e. Tests 11 and 12, additional lines appear in XRD patterns at 2.12, 1.63 and 4.04A, indicating either a new crystalline phase, or a modification of the manganous manganite phase. XRD data suggest a progressive phase transition to a less hydrated form of $MnO_2$ (incipient $\nu MnO_2$). This was subsequently confirmed by the precipitation of major $\nu MnO_2$ at lower oxidation conditions as is summarized in Table IV.

Under conditions of lower oxidation (i.e., Tests 13 and 14) dark brownish-black precipitates are formed containing minor zinc (1–2% Zn). X-ray diffraction patterns bear no resemblance to birnessite and other manganite phases, but correlate closely with those of $\nu MnO_2$. Precipitates that are not thoroughly washed contain detectable amounts of $ZnSO_4.H_2O$, which appears as a crystalline phase in dried products. This results in relatively high zinc values, as in the case of Test No. 11. Minor amounts of $ZnSO_4.H_2O$ were also detected by XRD in Test No. 10A.

X-ray diffraction patterns of the various products were developed showing the phases produced at different conditions of oxidation. A tabulation of "d" spacings of Tests 10A and 14 is compared from the major phases in Table IVa.

Precipitates from Tests 10A through 14 were thereafter heated for up to an hour at temperatures of 200° C and 450° C. in order to evaluate stability phase transformations as an aid to identification.

Dehydration at 200° C. resulted only in the collapse of the major spacing near 7.0–7.4 angstroms, apparently the result of removal of interlayered water.

At 450° C., decomposition takes place resulting in mixtures of mostly hydrohetaerolite, $HZnMn_2O_4$ and $\nu MnO_2$. Samples containing higher amounts of structural zinc convert to higher amounts of hydrohetaerlite (Test 10A), whereas, unwashed $ZnSO_4.H_2O$ converts simply to the anhydrous $ZnSO_4$, without bonding to the manganese oxide (Test 11).

(ambient temperature) to 24 hours in Test 20, manganese removal was increased somewhat to 14.61%.

TABLE V

MANGANESE REMOVAL FROM PURIFIED ZINC SULFATE SOLUTION (5.34 G/l Mn) AT DIFFERENT TEMPERATURES

| Test No. | Time Hours | Temp. °C. | Demanganized Solution g/l mn | Manganese Removed % |
|---|---|---|---|---|
| 16 | 2 | 90 | 0.0006 | 99.99 |
| 17 | 2 | 70 | 4.13 | 22.66 |
| 18 | 2 | 50 | 4.62 | 13.48 |
| 19 | 2 | 25 | 4.90 | 8.24 |
| 20 | 24 | 25 | 4.56 | 14.61 |

EXAMPLE 6

TABLE IV

MANGANESE REMOVAL FROM ZINC SULFATE SOLUTION WITH DIFFERENT AMOUNTS OF AMMONIUM PERSULFATE

| Test No. | Oxidant Added % Theoretical | Reaction Time Minutes | % Zn | % Mn | $ZnO.6MnO_2.2-4H_2O$ | $\gamma MnO_2$ | $ZnSO_4.H_2O$ | Filterabilityhz,1/60 |
|---|---|---|---|---|---|---|---|---|
| 10A | 460 | 30 | 8.00 | 48.20 | Major Constituent[1] | Not Detected | Minor Constituent[1] | Good |
| 11 | 230 | 30 | 9.40 | 42.40 | Moderate Constituent[1] | Small-Mod. Constituent[1] | Small Constituent[1] | Good |
| 12 | 230 | 60 | 5.60 | 50.60 | Moderate Constituent[1] | Small-Mod. Constituent[1] | Not Detected | Good |
| 13 | 130 | 60 | 1.82 | 59.10 | Not Detected | Major Constituent[1] | Not Detected | Good |
| 14 | 130 | 120 | 1.78 | 60.00 | Not Detected | Major Constituent[1] | Not Detected | Good |
| D-8 | 133 | 120 | 5.5 | 54.0 | Not Detected | Predominant | Present | Good |
| D-3 | 102 | 120 | 13.6 | 37.0 | Not Detected | Predominant | Higher than D-8 | Bad |
| D-4 | 102 | 180 | 16.0 | 39.0 | Not Detected | Predominant | Higher than D-8 | Bad |
| D-2 | 82 | 120 | 10.5 | 41.5 | Not Detected | Predominant | Higher than D-8 | Very Bad |
| D-1 | 50 | 120 | — | — | — | — | — | Unfilterable |

[1]Major — >40%; Moderate — 20–40%; Small — 10–20%; Minor — 2–10%; Trace — <2%.

TABLE IVa

X-RAY DIFFRACTION DATA

| Test 10A | | Birnessite* | | Tests 11 & 12 | | Tests 13 & 14 | | $\gamma MnO_2$** | |
|---|---|---|---|---|---|---|---|---|---|
| "d" Spacing | Int. | "d" Spacing | Int. | "d" Spacing | Int. | "d" Spacing | Int. | "d" Spacing | Int. |
| 7.3 A | 10 | 7.27 | 10 | 7.2 A | 6 | | | | |
| | | | | 4.03 | 5 | 3.98 | 10 | 3.96 | 10 |
| 3.60 | 2 | 3.60 | 2 | 3.60 | 1 | | | | |
| | | | | | | 2.56 | 3 | 2.60 | 6 |
| 2.44 | 5 | 2.44 | 5 | 2.41 | 10 | 2.41 | 9 | 2.42 | 10 |
| | | | | | | 2.33 | 3 | 2.32 | 8 |
| | | | | | | 2.18 | 1 | | |
| | | | | 2.12 | 3 | 2.13 | 5 | 2.12 | 8 |
| | | | | | | 1.89 | 1 | | |
| | | | | 1.63 | 6 | 1.63 | 8 | 1.64 | 8 |
| | | | | | | 1.61 | 3 | 1.61 | 3 |
| 1.41 | 4 | 1.412 | 5 | 1.41 | 2 | 1.43 | 1 | 1.42 | 6 |
| | | | | | | 1.36 | 2 | 1.36 | 6 |

*ASTM Card No. 13–105.
**ASTM Card No. 14–644.

EXAMPLE 5

Manganese removal from solution was found to be possible in the temperature range from ambient to boiling, as shown in table V. At lower temperatures, however, reaction time was slow. At 90° C., 2 hours reaction time and 135% of the theoretical oxidant requirements, 99.99% of the manganese was precipitated from purified zinc sulfate solution in Test 16. At 70° C., 50° C., and 25° C. with the same amount of oxidant and the same reaction time, in Tests 17, 18, and 19, the manganese precipitated was only 22.66%, 13.48% and 8.24%, respectively. By extending the reaction time at 25° C.

Tests carried out at 90° C. with a large excess of oxidant showed that a relatively short reaction time could be employed, as shown in Table IV. With 460% of the theoretical amount of oxidant, 99.84% of the manganese could be removed from solution in 30 minutes, as shown in Test 10A. With 130% of the theoretical amount of oxidant, however, 2 hours reaction time was required to effect this degree of manganese removal, as can be seen in Tests 13 and 14. Example 6 has shown that the temperature of solution is an important factor, when considering reaction time.

Economics, coupled with the adverse features of contaminating the manganese precipitate with other elements, and the type and size of precipitation equipment, would dictate the optimum reaction time in the industrial use of the process.

TABLE VI
MANGANESE REMOVAL FROM NEUTRAL ZINC SULFATE SOLUTION (5.24g/l Mn) WITH DIFFERENT REACTION TIMES

| Test No. | Time Mins. | $(NH_4)_2S_2O_8$ % Theor. | Demanganized Solution g/l Mn | % Manganese Removed |
|---|---|---|---|---|
| 10A | 30 | 130 | 0.0086 | 99.84 |
| 13 | 60 | 130 | 0.385 | 92.65 |
| 14 | 120 | 130 | <0.0002 | 99.99 |

EXAMPLE 7

Solutions which are highly acidic appear to break down oxidants of the persulfate type and more oxidant must be used to overcome this loss for maximum manganese precipitation.

As shown in Table I, the acid zinc sulfate and neutral zinc sulfate solutions contained similar amounts of manganese, i.e., 4.28 g/l Mn vs. 5.24 g/l Mn, but the hydrogen ion concentration was very different as the acid solution contained 103.6 g/l $H_2SO_4$ vs. pH 5.3 for the neutral solution.

Both solutions were treated with 130% of the theoretical amount of oxidant needed to precipitate all the manganese in 2 hours at 90° C. As can be seen in Tests 14 and 21 in Table VII, 99.99% of the manganese was removed from the neutral solution, whereas only 35.51% was removed from the acid solution. When the amount of oxidant was increased to 400% of the theoretical in Test 22, with the acid zinc sulfate solution, considerably more manganese was removed, i.e., 61.21%.

It can be concluded, therefore, that the process will work over a wide range of hydrogen ion concentration in solution, but the preferred pH would be close to neutral through alkaline, i.e., pH 5-12.

TABLE VII
MANGANESE REMOVAL FROM ACID AND NEUTRAL ZINC SULFATE SOLUTIONS

| Test No. | Original Solution | | | $(NH_4)_2S_2O_8$ % Theor. | Demanganized Solution g/l Mn | % Manganese Removed |
| | pH | g/l $H_2SO_4$ | g/l Mn | | | |
|---|---|---|---|---|---|---|
| 14 | 5.3 | — | 5.24 | 130 | <0.0002 | 99.99 |
| 21 | — | 103.6 | 4.28 | 130 | 2.76 | 35.51 |
| 22 | — | 103.6 | 4.28 | 400 | 1.66 | 61.21 |

EXAMPLE 8

A test was conducted under the preferred conditions noted in the other Examples, i.e., with ammonium persulfate as oxidant — 135% of the theoretical amount needed to precipitate the manganese according to Reaction I — at 90° C. for 2 hours — using purified zinc sulfate solution with pH 5.5.

The details of the test conditions were as follows:

1 liter of purified zinc solution was agitated 2 hours with 30 grams of ammonium persulfate at 90° C. the pulp was filtered and the filter cake washed to give 1 liter of demanganized solution. The cake was repulped and refiltered 3 times with 1 liter of water. Repulping was carried out by agitating for 30 minutes at 70° C. The precipitate was dried at 200° F. overnight.

As can be seen from Table VIII, 99.97% of the manganese was removed from solution with only 0.16% of the zinc. The manganese dioxide precipitate was of the gamma crystalline type and analyzed 61.0% Mn and 2% Zn with all other elements in very small amounts.

TABLE VIII
DEMANGANIZING PURIFIED ZINC SULFATE SOLUTION

| Material | Wt. or Vol. | Zinc g/l % | Zinc g | Zinc Total | Manganese g/l % | Manganese g | Manganese Total | pH | Cu mg/l (%) | Cd mg/l (%) | Co mg/l (%) | Ni mg/l (%) | Fe mg/l (%) | Pb mg/l (%) | As mg/l (%) | Sb mg/l (%) | Ag mg/l (%) | Te mg/l (%) | Se mg/l (%) |
|---|---|---|---|---|---|---|---|---|---|---|---|---|---|---|---|---|---|---|---|
| Pure Solution | 1 l. | 112.20 | 112.20 | 100.00 | 5.34 | 5.34 | 100.00 | 5.3 | <1. | <0.5 | 1.5 | <1. | <1. | <1. | <5. | <2. | <0.4 | <5. | <5. |
| Demanganized Solution | 1 l. | 105.84 | 105.840 | — | 0.0006 | 0.0006 | 0.01 | 1.5 | <1. | <0.5 | <0.5 | <1. | <1. | <1. | <5. | <2. | <0.4 | <5. | <5. |
| Wash Soln. 1 | 1 l. | 7.0 | 7.000 | — | 0.0008 | 0.0008 | 0.02 | | | | | | | | | | | | |
| Wash Soln. 2 | 1 l. | 0.30 | 0.300 | — | 0.0002 | nil | — | | | | | | | | | | | | |
| Wash Soln. 3 | 1 l. | 0.004 | 0.004 | — | 0.0002 | nil | — | | | | | | | | | | | | |
| Total Soln. | | | 113.144 | — | | 0.0014 | 0.03 | | | | | | | | | | | | |
| Precipitate | 8.81 | (2.0) | 0.176 | 0.16 | (61.0) | 5.368 | | | (<0.01) | (<0.005) | (<0.005) | (<0.01) | (<0.01) | (<0.01) | (<0.05) | (<0.02) | (<0.004) | (<0.05) | (<0.05) |
| Extraction % | | | 0.16 | | | | 99.97 | | | | | | | | | | | | |

While the invention has been described in connection with a preferred embodiment, it is not intended to limit the invention to the particular form set forth, but, on the contrary, it is intended to cover such alternatives, modifications and equivalents as may be included within the spirit and scope of the invention as defined by the appended claims.

What is claimed is:

1. A process for removal of soluble manganous ions from a zinc sulfate bearing solution containing the same comprising the steps of treating said solution, or a portion of said solution, with an oxidant capable of oxidizing soluble manganous ion to insoluble and filterable gamma-manganese dioxide at a temperature and for a time sufficient to precipitate at least a portion of the manganous ion present in said solution as gamma-manganese dioxide, said oxidant being in an amount of from about 130% to 150% of the theoretical amount required for substantially total manganese removal from said solution, and separating said precipitate from said solution.

2. The process of claim 1 wherein the temperature is from about 90° C. to the boiling temperature of said solution, and the time is from about 30 minutes to two hours.

3. The process of claim 2 wherein the oxidant is ammonium persulfate, sodium persulfate, potassium persulfate, sodium bismuthate, sodium bromate, lead dioxide, or a mixture thereof.

4. The process of claim 3 wherein the zinc sulfate bearing solution is at a pH of from about 5 to 12, the oxidant is ammonium persulfate, the reaction time is about 2 hours, and the temperature is about 90° C.

5. The process of claim 3 wherein the manganese-free solution is returned for use in a hot acid leach circuit of an electrolytic zinc recovery process whereby the contained ammonium, sodium or potassium ions and sulfate ions are employed for the precipitation of iron as jarosite from an iron containing electrolytic leach solution.

6. In the process of recovering zinc from a manganese containing zinc concentrate wherein the concentrate is roasted and leached with an acid to solubilize the zinc, the resultant solution treated to remove any iron therefrom as jarosite, and then subjected to electrolysis to recover the zinc, the improvement comprising admixing with a portion of said solution prior to electrolysis an oxidant capable of oxidizing soluble manganous ion to insoluble and filterable gamma-manganese dioxide at a temperature and for a time sufficient to precipitate at least a portion of the manganous ion present in said solution as gamma-manganese dioxide, said oxidant being in an amount of from about 130% to 150% of the theoretical amount required for substantially total manganese removal from said solution, and separating said precipitate from said solution.

7. The process of claim 6 wherein the oxidant is ammonium persulfate, sodium persulfate, or potassium persulfate, the temperature is from about 90° C. to the boiling temperature of said solution, the time is about 2 hours, and the pH of the solution is from about 5 to 12.

8. The process of claim 7 wherein the oxidant is ammonium persulfate, in an amount of 135% of said theoretical amount, the temperature is about 90° C., the time is about 2 hours, and the pH is about 5.5.

9. The process of claim 7 wherein the manganese-free solution is returned for use in a hot acid leach circuit of an electrolytic zinc recovery process whereby the contained ammonium, sodium or potassium ions and sulfate ions are employed for the precipitation of iron as jarosite from an iron containing electrolytic leach solution.

* * * * *

UNITED STATES PATENT AND TRADEMARK OFFICE
CERTIFICATE OF CORRECTION

PATENT NO. : 4,067,789
DATED : January 10, 1978
INVENTOR(S) : Leonard Harris and Alfred K. Hanson, Jr.

It is certified that error appears in the above-identified patent and that said Letters Patent are hereby corrected as shown below:

Column 4, line 17, reads "(1-21% Zn)", should read
--(1-2% Zn)--

Column 15, Table VIII, column entitled "Wt. or Vol.", first five materials read "1l." and should read --1ℓ--

Column 15, Table VIII, column entitled "Wt. or Vol.", material "Precipitate" reads "8.8l." should read --8.8g--

Signed and Sealed this

Twentieth Day of June 1978

[SEAL]

Attest:

RUTH C. MASON
Attesting Officer

DONALD W. BANNER
Commissioner of Patents and Trademarks

UNITED STATES PATENT AND TRADEMARK OFFICE
CERTIFICATE OF CORRECTION

PATENT NO. : 4,067,789
DATED : January 10, 1978
INVENTOR(S) : Leonard Harris and Alfred K. Hanson, Jr.

It is certified that error appears in the above-identified patent and that said Letters Patent are hereby corrected as shown below:

In the drawings, a line should extend from PURIFICATION/FIL-TRATION to ELECTROLYSIS as shown below:

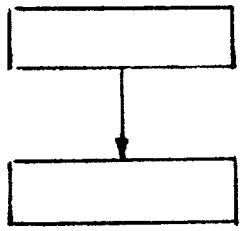

Column 4, lines 13, 14 and 24, in each instance, "$\nu$-$MnO_2$" should read --$\gamma$-$MnO_2$--.

Column 10, lines 52, 53 and 60, in each instance, "$\nu$-$MnO_2$" should read --$\gamma$-$MnO_2$--.

Column 11, line 12, "$\nu$-$MnO_2$" should read --$\gamma$-$MnO_2$--.

Column 11, in Table IV, "Filterabilityhz,1/60" should read --Filterability--.

Column 13, in Table VI, at about line 17, under Test 10A, "130%" should read --460--.

Signed and Sealed this

Tenth Day of October 1978

[SEAL]

Attest:

RUTH C. MASON
Attesting Officer

DONALD W. BANNER
Commissioner of Patents and Trademarks